United States Patent
Zeng et al.

(10) Patent No.: US 9,325,616 B2
(45) Date of Patent: Apr. 26, 2016

(54) PACKET SENDING METHOD AND NETWORK DEVICE

(71) Applicant: Huawei Technologies Co., Ltd., Shenzhen, Guangdong (CN)

(72) Inventors: Qing Zeng, Shenzhen (CN); Xiaohu Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 13/772,899

(22) Filed: Feb. 21, 2013

(65) Prior Publication Data

US 2013/0230049 A1    Sep. 5, 2013

(30) Foreign Application Priority Data

Feb. 21, 2012   (CN) ............ 2012 1 0039629

(51) Int. Cl.
*H04L 12/741*   (2013.01)
*H04L 12/46*    (2006.01)

(52) U.S. Cl.
CPC .......... *H04L 45/745* (2013.01); *H04L 12/4633* (2013.01)

(58) Field of Classification Search
CPC ..... H04L 45/00; H04L 12/4625; H04L 29/06; H04L 45/02; H04L 45/50; H04L 45/52; H04L 45/66; H04L 49/3009; H04L 49/351; H04L 63/1466; H04L 69/22
USPC .......................... 370/254–350; 709/201–213
See application file for complete search history.

(56) References Cited

U.S. PATENT DOCUMENTS 7,856,509 B1 * 12/2010 Kodeboyina ............... 709/238
8,315,158 B2 * 11/2012 Goose et al. ............... 370/222

(Continued)

FOREIGN PATENT DOCUMENTS

| CN | 101009629 A | 8/2007 |
| CN | 101554253 A | 9/2009 |
| CN | 101577680 A | 11/2009 |

(Continued)

OTHER PUBLICATIONS

Issac et al., "BGP MPLS Based MAC VPN," Jun. 2, 2010, Network Working Group, IETF, Fremont, California.

(Continued)

*Primary Examiner* — Ayaz Sheikh
*Assistant Examiner* — Debebe Asefa
(74) *Attorney, Agent, or Firm* — Leydig, Voit & Mayer, Ltd.

(57) ABSTRACT

The present invention provides a packet sending method and a network device. The packet sending method includes: receiving, by a network device, a first data packet; and if a MAC entry matching a destination MAC address of the first data packet is not found in a media access control MAC address table of the network device, sending, by the network device, the first data packet according to a forwarding behavior in a MAC default entry of the MAC address table. When the MAC entry matching the destination MAC address of the first data packet is not found, the network device does not need to flood the first data packet on all interfaces, but directly sends the first data packet according to the MAC default entry in the own MAC address table, thereby reducing a need for MAC address capacity in the network device, and not increasing unnecessary network traffic.

13 Claims, 5 Drawing Sheets

(56) References Cited

U.S. PATENT DOCUMENTS 8,667,177 B2 * 3/2014 Doshi et al. .................. 709/242
2009/0135722 A1 5/2009 Boers et al.

FOREIGN PATENT DOCUMENTS

| CN | 102347889 A | 2/2012 |
| WO | 2004047384 A1 | 6/2004 |
| WO | WO 2004047384 A1 | 6/2004 |

OTHER PUBLICATIONS

Extended European Search Report in corresponding European Patent Application No. 13154113.8 (Jul. 13, 2010).

* cited by examiner

PACKET SENDING METHOD AND NETWORK DEVICE

CROSS-REFERENCE TO RELATED APPLICATIONS

This application claims priority to Chinese Patent Application No. 201210039629.8, filed on Feb. 21, 2012, which is hereby incorporated by reference in its entirety.

TECHNICAL FIELD

The present invention relates to communications technologies, and in particular, to a packet sending method and a network device.

BACKGROUND

In the prior art, when a packet is forwarded, layer two forwarding is guided according to exact matching of a media access control (Media Access Control; hereinafter referred to as MAC) address. When the packet is forwarded in Ethernet (Ethernet), the packet is forwarded to all interfaces in an unknown unicast flooding (Flooding) way if a matching MAC entry does not exist, thereby achieving a final effect for sending the packet to a destination.

The basic idea for an Ethernet virtual private network (Ethernet Virtual Private Network; hereinafter referred to as EVPN) is to learn the MAC address on a control plane by expanding a border gateway protocol (Border Gateway Protocol; hereinafter referred to as BGP) protocol, thereby realizing a function of layer two VPN (Layer two VPN; hereinafter referred to as L2VPN). Learning the MAC address on the control plane naturally solves the problems caused by performing MAC address learning on a data plane, such as difficulty to realize multi-homing of customer edge (Customer Edge; hereinafter referred to as CE) device, unknown unicast Flooding and address resolution protocol (Address Resolution Protocol; hereinafter referred to as ARP) broadcasting storm. However, with the development of cloud computing, the scale of a data center is expanding continuously, but the way for the EVPN to learn the MAC address on the control plane needs each provider edge (Provider Edge; hereinafter referred to as PE) device to store MAC address tables of all connected VPN sites, which needs very high capacity and performance of the PE device.

However, if a capacity limit is taken into account, and an overall MAC address table is not stored on a network device (for example, a PE device), when the packet is forwarded, the packet may be flooded on all interfaces if a MAC entry matching a destination MAC address of the packet does not exist in the MAC address table, but unnecessary network traffic may therefore be increased.

SUMMARY

The present invention provides a packet sending method and a network device, so as to reduce a need for MAC address capacity in the network device and save network traffic.

In one aspect, the present invention provides a packet sending method, including:
receiving, by a network device, a first data packet; and
if a MAC entry matching a destination MAC address of the first data packet is not found in a media access control MAC address table of the network device, sending, by the network device, the first data packet according to a forwarding behavior in a MAC default entry of the MAC address table.

In another aspect, the present invention provides a network device, including:
a receiving module, configured to receive a first data packet;
a determining module, configured to determine that a MAC entry matching a destination MAC address of the first data packet is not found in a media access control MAC address table of the network device; and
a sending module, configured to send the first data packet according to a forwarding behavior in a MAC default entry of the MAC address table.

In one aspect, the technical effect of the present invention is as follows: after the first data packet is received, the network device sends the first data packet according to the forwarding behavior in the MAC default entry of the MAC address table if the MAC entry matching the destination MAC address of the first data packet is not found in the MAC address table of the network device. In the present invention, when the MAC entry matching the destination MAC address of the first data packet is not found, the network device does not need to flood the first data packet on all interfaces, but directly sends the first data packet according to the MAC default entry in the own MAC address table, thereby reducing a need for MAC address capacity in the network device, and not increasing unnecessary network traffic.

In another aspect, the technical effect of the present invention is as follows: after the receiving module receives the first data packet, the sending module sends the first data packet according to the forwarding behavior in the MAC default entry of the above-mentioned MAC address table if the determining module determines that the MAC entry matching the destination MAC address of the first data packet is not found in the MAC address table of the network device. In the present invention, when the MAC entry matching the destination MAC address of the first data packet is not found, the network device does not need to flood the first data packet on all interfaces, but directly sends the first data packet according to the MAC default entry in the own MAC address table, thereby reducing a need for MAC address capacity in the network device, and not increasing unnecessary network traffic.

BRIEF DESCRIPTION OF DRAWINGS

To illustrate the technical solutions in the embodiments of the present invention or in the prior art more clearly, the following briefly describes the accompanying drawings needed for describing the embodiments or the prior art. Apparently, the accompanying drawings in the following description show some embodiments of the present invention, and persons skilled in the art may derive other drawings from these accompanying drawings without creative efforts.

DESCRIPTION OF EMBODIMENTS

To make the objectives, technical solutions, and advantages of the embodiments of present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons skilled in the art based on the embodiments of the present invention without creative efforts shall fall within the protection scope of the present invention.

Figure 1:
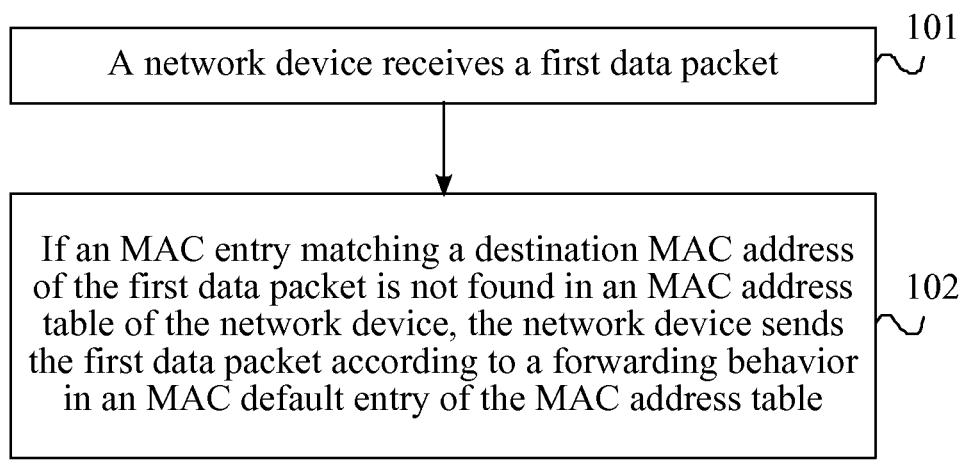
FIG. 1 is a flow chart of an embodiment of a packet sending method of the present invention.

FIG. 1 is a flow chart of an embodiment of a packet sending method of the present invention, and as shown in FIG. 1, the packet sending method may include:

Step 101: A network device receives a first data packet.

Step 102: If a MAC entry matching a destination MAC address of the first data packet is not found in a MAC address table of the network device, the network device sends the first data packet according to a forwarding behavior in a MAC default entry of the MAC address table.

In this embodiment, the MAC default entry is used to indicate the forwarding behavior when the MAC entry matching the destination MAC address of the data packet received by the network device is not found in the MAC address table; the MAC address in the MAC default entry is a default MAC address, and a value of each bit of the default MAC address is 0. The MAC default entry is used to indicate a forwarding path when the destination MAC address of the data packet received by the network device is not in the own MAC address table, and the forwarding path is a special forwarding path. Simply, the MAC default entry is the MAC entry used by the network device when the MAC entry matching the destination MAC address is not found. In the MAC address table, the MAC address in the MAC default entry is the default MAC address which appears in the form of all 0.

In an implementation manner of this embodiment, the network device may be a PE device. In the implementation manner, before the step 101, the PE device may receive an update message sent by a route reflector (Route Reflector; hereinafter referred to as RR) at first, the update message sent by the RR carries network layer reachability information (Network Layer Reachability Information; hereinafter referred to as NLRI), a next hop address and a route target (Route Target; hereinafter referred to as RT) attribute, where the NLRI includes a default MAC address, the next hop address is an address of the RR, the RT attribute is used to identify a VPN that the default MAC address belongs to, and for example, the default MAC address may be included in a MAC address (MAC Address) field of the NLRI.

Then, the PE device may determine a tunnel between the PE device and the RR according to the next hop address, and generate, according to the NLRI and the next hop address, the MAC default entry of the VPN identified by the RT attribute, where the forwarding behavior in the MAC default entry of the VPN includes sending, via the tunnel between the PE device and the RR, the data packet received by the PE device to the RR; for example, after the tunnel is established between the PE device and the RR, the PE device may find the forwarding path (that is, route iteration) of the next hop according to the next hop address, and then may find the tunnel between the PE device and the RR, thereby may determine the tunnel between the PE device and the RR. After the tunnel between the PE device and the RR is determined according to the next hop address, the PE device may generate, according to the NLRI and the next hop address, the MAC default entry of the VPN identified by the RT attribute, where the MAC address in the default entry of the VPN is the default MAC address, and the forwarding behavior in the default entry of the VPN is sending, via the tunnel between the PE and the RR, the data packet of the VPN received by the PE device to the RR.

Finally, the PE device stores the MAC default entry of the VPN into the MAC address table of the PE device. For example, while storing the MAC default entry of the VPN, the PE device may store the MAC default entry of the VPN into a fixed special position of the MAC address table of the PE device, such as a first or last position of the MAC address table.

In the implementation manner, the step 102 may be as follows: the PE device sends the first data packet to the RR via the tunnel between the PE device and the RR, so that after finding, in the MAC address table of the RR, a first MAC entry matching the destination MAC address of the first data packet, the RR sends, according to the first MAC entry, the first data packet to the PE device accessed by a VPN site that the destination MAC address belongs to.

In another implementation manner of this embodiment, the network device may be a first switching device. In the implementation manner, before the step 101, the first switching device may further configure the MAC default entry in the MAC address table of the first switching device, the forwarding behavior in the MAC default entry includes sending the data packet received by the first switching device to an upper-layer switching device of the first switching device, and the MAC address in the MAC default entry is the default MAC address. In hierarchical structure networking, a switching device with lower capacity and performance is usually placed on a lower layer, and a switching device with higher capacity and performance is placed on an upper layer. In the present invention, the switching device placed on the lower layer is called a lower-layer switching device, and the switching device placed on the upper layer is called an upper-layer switching device; and one upper-layer switching device may be connected to a plurality of lower-layer switching devices to implement the functions of high-capacity user accessing and high-performance forwarding together.

In the implementation manner, the step 102 may be as follows: the first switching device sends the first data packet to the upper-layer switching device of the first switching device according to the forwarding behavior in the MAC default entry.

In the embodiment, after the first data packet is received, the network device sends the first data packet according to the forwarding behavior in the MAC default entry of the MAC address table if the MAC entry matching the destination MAC address of the first data packet is not found in the MAC address table of the network device. In the embodiment, when the MAC entry matching the destination MAC address of the first data packet is not found, the network device does not need to flood the first data packet on all interfaces, but directly sends the first data packet according to the MAC default entry in the own MAC address table, thereby reducing a need for MAC address capacity in the network device, and not increasing unnecessary network traffic.

In the method provided by the embodiment as shown in FIG. 1, the MAC default entry is stored in the MAC address table of the network device. When the data packet arrives at the network device, if the network device does not find, in the own MAC address table, the MAC entry matching the destination MAC address of the data packet, the network device does not flood on all interface according to the usual forwarding principle of Ethernet, but sends the data packet according to the forwarding behavior in the MAC default entry. The present invention greatly saves the need for MAC address capacity in the network device, does not increase the unnecessary network traffic, and may further improve networking flexibility of the network devices with different hardware capabilities.

Figure 2:
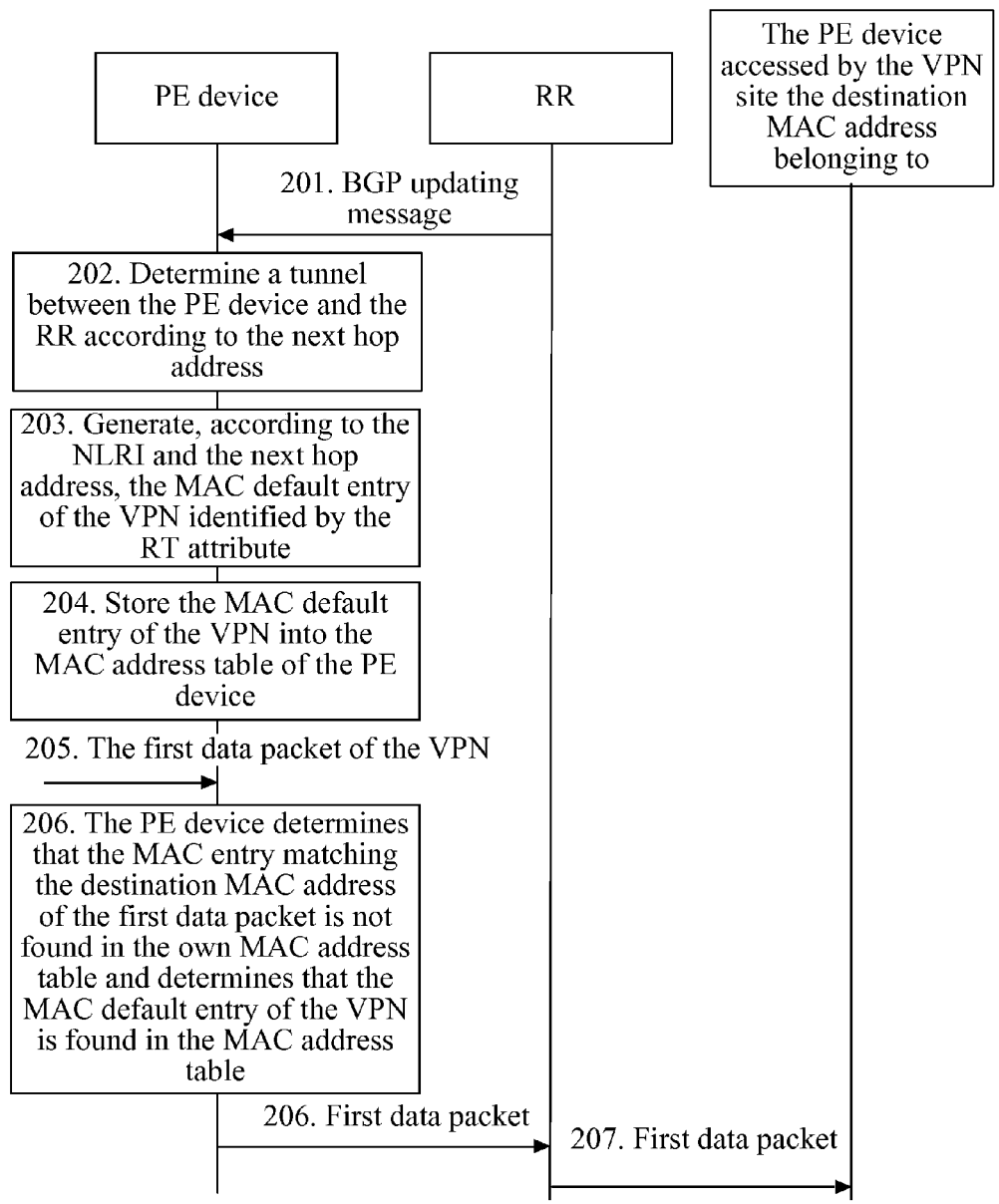
FIG. 2 is a flow chart of another embodiment of the packet sending method of the present invention.

FIG. 2 is a flow chart of another embodiment of a packet sending method of the present invention, and as shown in FIG. 2, the packet sending method may include:

Step 201: The PE device receives a BGP update packet sent by the RR, where the BGP update packet carries an NLRI, a next hop address and an RT attribute.

The NLRI includes a default MAC address, namely, the MAC address with all 0 in each bit; for example, the default MAC address may be included in the MAC address (MAC Address) field of the NLRI; the next hop address is an address of the RR, such as an Internet protocol (Internet Protocol; hereinafter referred to as IP) address of the RR; and the RT attribute is used to identify a VPN that the default MAC address belongs to.

Step 202: The PE device determines a tunnel between the PE device and the RR according to the next hop address.

For example, after the tunnel between the PE device and the RR is established, the PE device may find the forwarding path (that is, route iteration) of the next hop according to the next hop address, and then may find the tunnel between the PE device and the RR, thereby may determine the tunnel between the PE device and the RR.

Step 203: The PE device generates, according to the NLRI and the next hop address, the MAC default entry of the VPN identified by the RT attribute, where the forwarding behavior in the default entry of the VPN includes sending, via the tunnel between the PE device and the RR, the data packet received by the PE device to the RR.

For example, after the tunnel between the PE device and the RR is determined according to the next hop address, the PE device may generate, according to the NLRI and the next hop address, the MAC default entry of the VPN identified by the RT attribute, the MAC address in the default entry of the VPN is the default MAC address, and the forwarding behavior in the default entry of the VPN is sending, via the tunnel between the PE and the RR, the data packet of the VPN received by the PE device to the RR.

In this embodiment, the MAC default entry of the VPN is used to indicate the forwarding behavior when the MAC entry matching the destination MAC address of the data packet of the VPN received by the network device is not found in the MAC address table; the MAC address in the MAC default entry of the VPN includes a default MAC address, and a value of each bit of the default MAC address is 0, namely, the default MAC address appears in the form of all 0. The MAC default entry of the VPN is used to indicate a forwarding path when the destination MAC address of the data packet of the VPN received by the network device is not in the own MAC address table, and the forwarding path is a special forwarding path. Simply, the MAC default entry of the VPN is the MAC entry used by the network device when the MAC entry matching the destination MAC address is not found.

Step 204: The PE device stores the MAC default entry of the VPN into the MAC address table of the PE device.

For example, while storing the MAC default entry of the VPN, the PE device may store the MAC default entry of the VPN into a fixed special position of the MAC address table of the PE device, such as a first or last position of the MAC address table.

Step 205: The PE device receives the first data packet of the VPN.

Step 206: The PE device sends the first data packet to the RR via the tunnel between the PE device and the RR according to the forwarding behavior in the MAC default entry of the VPN if the PE device determines that the MAC entry matching the destination MAC address of the first data packet is not found in the own MAC address table and determines that the MAC default entry of the VPN is found in the MAC address table.

Step 207: After finding, in the MAC address table of the RR, a first MAC entry matching the destination MAC address of the first data packet, the RR sends, according to the first MAC entry, the first data packet to the PE device accessed by the VPN site that the destination MAC address belongs to.

In this embodiment, the subsequent data packet sent to the destination MAC address is in the MAC address table of the PE device after the PE device learns the destination MAC address of the first data packet via a control plane or data plane, so that the MAC entry matching the destination MAC address may be directly found, in this way, the PE device may forward subsequent data packet according to the MAC entry matching the destination MAC address without using the MAC default entry.

In the embodiment, when the MAC entry matching the destination MAC address of the first data packet is not found, the PE device does not need to flood the first data packet on all interfaces, but directly sends the first data packet according to the MAC default entry in the own MAC address table, thereby reducing a need for MAC address capacity in the PE device, and not increasing unnecessary network traffic.

Figure 3:
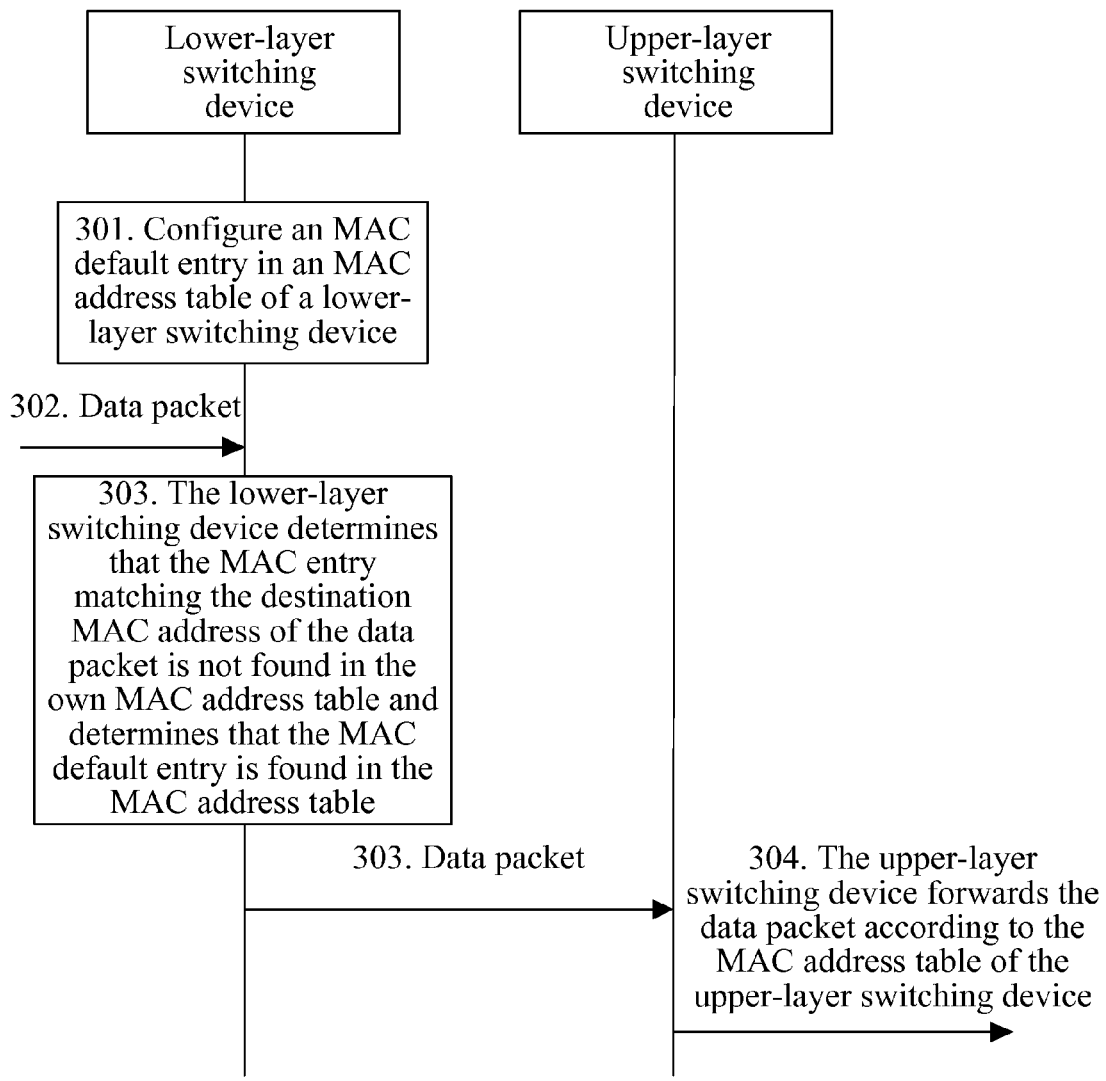
FIG. 3 is a flow chart of still another embodiment of the packet sending method of the present invention.

FIG. 3 is a flow chart of still another embodiment of a packet sending method of the present invention, and this embodiment introduces a packet sending method in a networking scheme of learning a MAC address on a data plane.

As shown in FIG. 3, the packet sending method may include:

Step 301: Configure a MAC default entry in a MAC address table of a lower-layer switching device.

Specifically, in hierarchical structure networking, the switching device with lower capacity and performance is usually placed on the lower layer, and the switching device with higher capacity and performance is placed on the upper layer. In the present invention, the switching device placed on the lower layer is called a lower-layer switching device, and the switching device placed on the upper layer is called an upper-layer switching device; and one upper-layer switching device may be connected to a plurality of lower-layer switching devices to implement the functions of high-capacity user accessing and high-performance forwarding together. Because the performance and capacity of the lower-layer switching device are lower, in this embodiment, the lower-layer switching device may be configured not to learn all of the MAC addresses, but the MAC default entry is configured in the MAC address table of the lower-layer switching device. The forwarding behavior in the MAC default entry includes sending the data packet received by the lower-layer switching device to the upper-layer switching device connected to the lower-layer switching device, where the MAC address in the MAC default entry is the default MAC address.

Step 302: The lower-layer switching device receives the data packet.

Step 303: If the lower-layer switching device determines that the MAC entry matching the destination MAC address of the data packet is not found in the own MAC address table and determines that the MAC default entry is found in the MAC address table, the lower-layer switching device sends, according to the forwarding behavior in the MAC default entry, the data packet to the upper-layer switching device connected to the lower-layer switching device.

Step 304: The upper-layer switching device forwards the data packet according to the MAC address table of the upper-layer switching device.

In the embodiment, when the MAC entry matching the destination MAC address of the data packet is not found, the lower-layer switching device does not need to flood the data packet on all interfaces, but directly sends the data packet according to the MAC default entry in the own MAC address table, thereby reducing a need for MAC address capacity in the lower-layer switching device, and not increasing unnecessary network traffic.

Persons skilled in the art may understand that all or part of the steps of the method according to the embodiments of the present invention may be implemented by a program instructing relevant hardware. The aforementioned program may be stored in a computer-readable storage medium. The steps including each of the method embodiments are performed while the program is performed; and the aforementioned medium includes various mediums capable of storing program codes, such as a ROM, a RAM, a disk or a compact disc.

Figure 4:
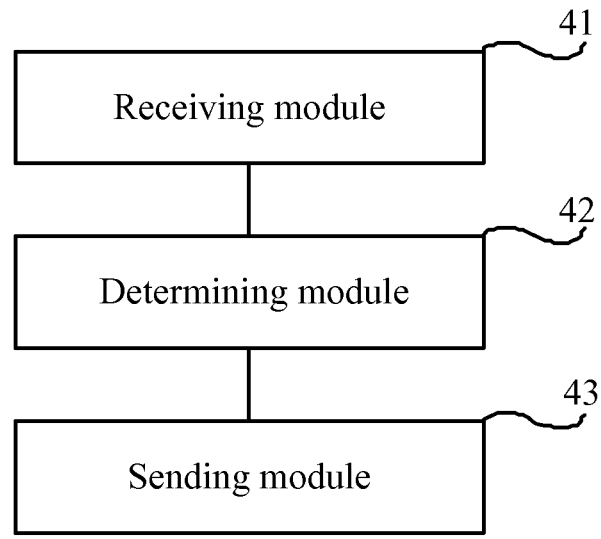
FIG. 4 is a schematic structural diagram of an embodiment of a network device of the present invention.

FIG. 4 is a schematic structural diagram of an embodiment of a network device of the present invention. The network device in this embodiment may realize the process of the embodiment as shown in FIG. 1 in the present invention, and as shown in FIG. 4, the network device may include a receiving module 41, a determining module 42 and a sending module 43;

the receiving module 41 is configured to receive a first data packet;

the determining module 42 is configured to determine that a MAC entry matching a destination MAC address of the first data packet is not found in a MAC address table of the network device; and the sending module 43 is configured to send the first data packet according to a forwarding behavior in a MAC default entry of the MAC address table.

In this embodiment, the MAC default entry is used to indicate the forwarding behavior when the MAC entry matching the destination MAC address of the data packet received by the network device is not found in the MAC address table; the MAC address in the MAC default entry includes a default MAC address, and a value of each bit of the default MAC address is 0. The MAC default entry is used to indicate a forwarding path when the destination MAC address of the data packet received by the network device is not in the own MAC address table, and the forwarding path is a special forwarding path. Simply, the MAC default entry is the MAC entry used by the network device when the MAC entry matching the destination MAC address is not found. In the MAC address table, the MAC address in the MAC default entry is the default MAC address which appears in the form of all 0.

In this embodiment, the network device may be the network device for sending the packet according to the MAC address table, such as a switching device or a PE device. The present invention does not limit the specific form of the network device.

In the network device, after the receiving module 41 receives the first data packet, the sending module 43 sends the first data packet according to the forwarding behavior in the MAC default entry of the MAC address table when the determining module 42 determines that the MAC entry matching the destination MAC address of the first data packet is not found in the MAC address table of the network device. In this embodiment, when the MAC entry matching the destination MAC address of the first data packet is not found, the network device does not need to flood the first data packet on all interfaces, but directly sends the first data packet according to the MAC default entry in the own MAC address table, thereby reducing a need for MAC address capacity in the network device, and not increasing unnecessary network traffic.

Figure 5:
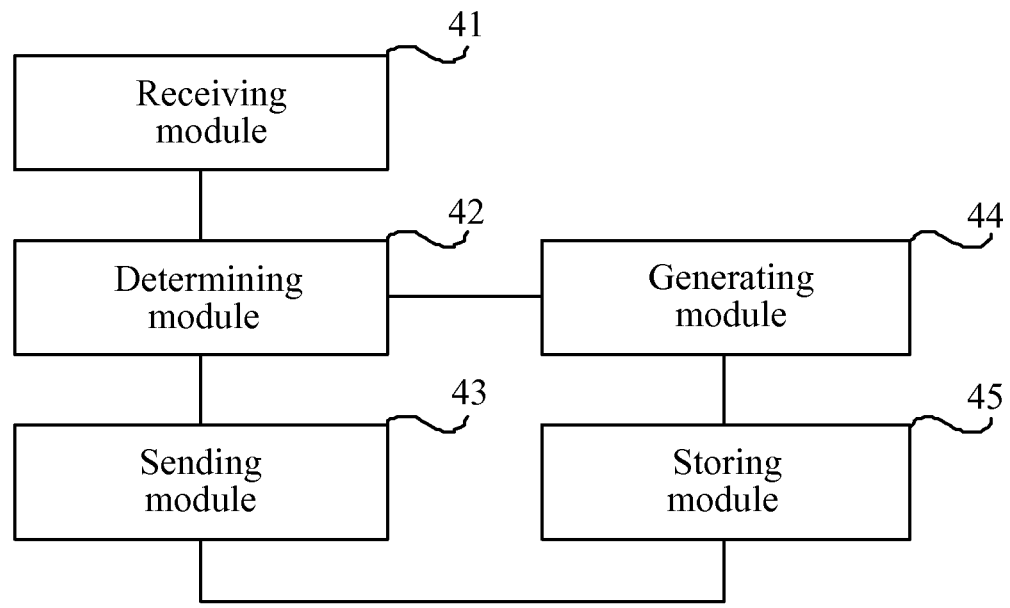
FIG. 5 is a schematic structural diagram of another embodiment of the network device of the present invention.

FIG. 5 is a schematic structural diagram of another embodiment of a network device of the present invention. The network device in this embodiment may be a PE device, and comparing with the network device as shown in FIG. 4, a difference is that the network device shown in FIG. 5 may further include a generating module 44 and a storing module 45;

in this embodiment, the receiving module 41 is further configured to receive an update message sent by a RR, where the update message sent by the RR carries an NLRI, a next hop address and an RT attribute, the NLRI includes a default MAC address, the next hop address is an address of the RR, and the RT attribute is used to identify a VPN that the default MAC address belongs to;

the determining module 42 is further configured to determine a tunnel between the network device and the RR according to the next hop address;

the generating module 44 is configured to generate, according to the NLRI and the next hop address, the MAC default entry of the VPN identified by the RT attribute, where the forwarding behavior in the default entry of the VPN includes sending, via the tunnel between the network device and the RR, the data packet received by the network device to the RR; and the storing module 45 is configured to store the MAC default entry of the VPN into the MAC address table of the network device; for example, while storing the MAC default entry of the VPN, the storing module 45 may store the MAC default entry of the VPN into a fixed special position of the MAC address table of the network device, such as a first or last position of the MAC address table.

For example, the sending module 43 may send the first data packet to the RR via the tunnel between the PE device and the RR, so that after finding, in the MAC address table of the RR, a first MAC entry matching the destination MAC address of the first data packet, the RR sends, according to the first MAC entry, the first data packet to the PE device accessed by a VPN site that the destination MAC address belongs to.

In the embodiment, when the MAC entry matching the destination MAC address of the first data packet is not found, the network device does not need to flood the first data packet on all interfaces, but directly sends the first data packet according to the MAC default entry in the own MAC address table, thereby reducing a need for MAC address capacity in the network device, and not increasing unnecessary network traffic.

Figure 6:
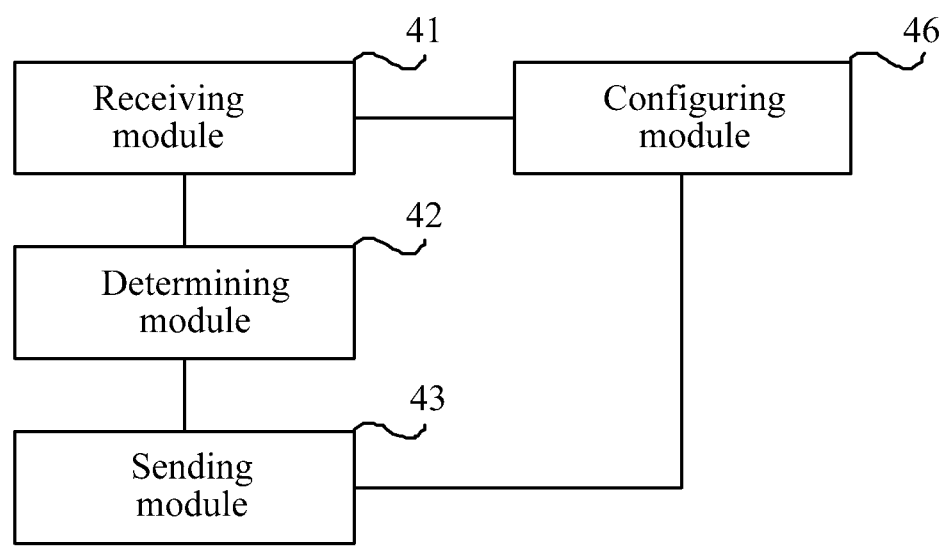
FIG. 6 is a schematic structural diagram of still another embodiment of the network device of the present invention.

FIG. 6 is a schematic structural diagram of still another embodiment of a network device of the present invention. The network device in the embodiment may be a switching device, and comparing with the network device as shown in FIG. 4, the difference is that the network device as shown in FIG. 6 may further include a configuring module 46;

the configuring module 46 is configured to configure a MAC default entry in a MAC address table of the network device, where a forwarding behavior in the MAC default entry includes sending a data packet received by the network device to an upper-layer switching device connected to the network device, where the MAC address in the MAC default entry is the default MAC address.

In this embodiment, specifically, the sending module 43 may send, according to the forwarding behavior in the MAC default entry, the first data packet to the upper-layer switching device connected to the network device.

In this embodiment, when the MAC entry matching the destination MAC address of the first data packet is not found, the network device does not need to flood the first data packet on all interfaces, but directly sends the first data packet according to the MAC default entry in the own MAC address table, thereby reducing a need for MAC address capacity in the network device, and not increasing unnecessary network traffic.

It should be understood by persons skilled in the art that the accompanying drawings are merely schematic diagrams of an exemplary embodiment, and modules or processes in the accompanying drawings are not necessarily needed in implementing the present invention.

Those skilled in the art may understand that the modules in the devices provided in the embodiments may be arranged in the devices according to the description of the embodiments, or may be arranged in one or multiple devices which are different from those described in the embodiments. The modules in the embodiments may be combined into one module, or split into multiple submodules.

Finally, it should be noted that the above embodiments are merely intended for describing the technical solutions of the present invention other than limiting the present invention. Although the present invention is described in detail with reference to the embodiments, persons skilled in the art should understand that they may still make modifications to the technical solutions described in the embodiments, or make equivalent substitutions to some or all the technical features thereof, without departing from the spirit and scope of the technical solutions of the embodiments of the present invention.

What is claimed is:

1. A method performed by a network device for sending a packet, the network device storing a Media Access Control (MAC) address table, wherein the MAC address table includes a MAC default entry, the MAC default entry including an association between a default MAC address and a next hop address, wherein the MAC default entry is used to indicate a forwarding behavior when the network device finds no MAC entry in the MAC address table matching a destination MAC address of a received data packet, wherein the method comprises:
   receiving the data packet, the received data packet including the destination MAC address;
   determining whether there is a MAC entry in the MAC address table matching the destination MAC address of the data packet;
   in response to a determination that there is no MAC entry in the MAC address table matching the destination MAC address of the data packet, sending the data packet to a network device identified by the next hop address.

2. The method according to claim 1, wherein a value of each bit of the default MAC address is 0.

3. The method according to claim 1, wherein the network device comprises a provider edge (PE) device;
   before the receiving the data packet, the method further comprises:
   receiving, by the PE device, an update message sent by a route reflector, wherein the update message sent by the route reflector carries network layer reachability information, the next hop address and a route target attribute, wherein the network layer reachability information comprises the default MAC address, the next hop address is an address of the route reflector, and the route target attribute is used to identify a virtual private network that the default MAC address belongs to;
   determining, by the PE device, a tunnel between the PE device and the route reflector according to the next hop address;
   generating, according to the network layer reachability information and the next hop address, the MAC default entry of the virtual private network identified by the route target attribute, wherein the forwarding behavior indicated by the MAC default entry of the virtual private network comprises sending, via the tunnel between the PE device and the route reflector, the data packet received by the PE device to the route reflector; and
   storing, by the PE device, the MAC default entry of the virtual private network into the MAC address table of the PE device.

4. The method according to claim 3, wherein the sending the data packet according to the forwarding behavior indicated by the MAC default entry in the MAC address table comprises:
   sending, by the PE device, the data packet to the route reflector via the tunnel between the PE device and the route reflector.

5. The method according to claim 1, wherein the network device comprises a switching device;
   before the receiving the data packet, the method further comprises:
   configuring, by the switching device, the MAC default entry in the MAC address table, wherein the forwarding behavior indicated by the MAC default entry comprises sending the data packet received by the switching device to an upper-layer switching device of the switching device.

6. The method according to claim 5, wherein the sending the data packet according to the forwarding behavior indicated by the MAC default entry in the MAC address table comprises:
   sending, by the switching device, the data packet to the upper-layer switching device of the switching device according to the forwarding behavior indicated by the MAC default entry.

7. A network device, the network device storing a Media Access Control (MAC) address table, wherein the MAC address table includes a MAC default entry, the MAC default entry including an association between a default MAC address and a next hop address, wherein the MAC default entry is used to indicate a forwarding behavior when the network device finds no MAC entry in the MAC address table matching a destination MAC address of a received data packet, wherein the network device comprises:
   a receiving module, configured to receive the data packet, the received data packet including the destination MAC address;
   a determining module, configured to determine whether there is a MAC entry in the MAC address table matching the destination MAC address of the data packet ; and
   a sending module, configured to send, in response to a determination that there is no MAC entry in the MAC address table matching the destination MAC address of the data packet, the data packet to a network device identified by the next hop address.

8. The network device according to claim 7, further comprising: a generating module and a storing module; wherein
   the receiving module is further configured to receive an update message sent by a route reflector, wherein the update message sent by the route reflector carries network layer reachability information, the next hop address and a route target attribute, wherein the network layer reachability information comprises the default MAC address, the next hop address is an address of the route reflector, and the route target attribute is used to identify a virtual private network that the default MAC address belongs to;

the determining module is further configured to determine a tunnel between the network device and the route reflector according to the next hop address;

the generating module is configured to generate, according to the network layer reachability information and the next hop address, the MAC default entry of the virtual private network identified by the route destination attribute, wherein the forwarding behavior indicated by the MAC default entry of the virtual private network comprises sending, via the tunnel between the network device and the route reflector, the data packet received by the network device to the route reflector; and the storing module is configured to store the MAC default entry of the virtual private network into the MAC address table.

9. The network device according to claim 8, wherein
the sending module is configured to send the data packet to the route reflector via the tunnel between the network device and the route reflector according to the forwarding behavior indicated by the MAC default entry.

10. The network device according to claim 7, further comprising:

a configuring module, configured to configure the MAC default entry in the MAC address table, wherein the forwarding behavior indicated by the MAC default entry comprises sending the data packet received by the network device to an upper-layer switching device of the network device.

11. The network device according to claim 10, wherein
the sending module is configured to send the data packet to the upper-layer switching device of the network device according to the forwarding behavior indicated by the MAC default entry.

12. A computer program product comprising a non-transitory storage medium storing computer executable instructions, wherein the computer executable instructions cause a network device storing a Media Access Control (MAC) address table to perform a process, wherein the MAC address table includes a MAC default entry, the MAC default entry including an association between a default MAC address and a next hop address, wherein the MAC default entry is used to indicate a forwarding behavior when the network device finds no MAC entry in the MAC address table matching a destination MAC address of a received data packet, wherein the process comprises:

receiving the data packet, the received data packet including the destination MAC address;

determining whether there is a MAC entry in the MAC address table matching the destination MAC address of the data packet;

in response to a determination that there is no MAC entry in the MAC address table matching the destination MAC address of the data packet, sending the data packet to a network device identified by the next hop address.

13. The computer program product according to claim 12, wherein and a value of each bit of the default MAC address is 0.

* * * * *